United States Patent [19]

Enomoto et al.

[11] 4,327,428

[45] Apr. 27, 1982

[54] DECORATIVE PLATE FOR A TIMEPIECE

[75] Inventors: Tadao Enomoto, Higashimurayama; Hiroshi Koide, Tokyo, both of Japan

[73] Assignee: Citizen Watch Company Limited, Tokyo, Japan

[21] Appl. No.: 7,704

[22] Filed: Jan. 30, 1979

[30] Foreign Application Priority Data

Jan. 30, 1978 [JP] Japan .................................... 53-9018
Feb. 15, 1978 [JP] Japan ............................ 53-17088[U]

[51] Int. Cl.[3] ...................... G04B 19/06; B23P 23/00; B41C 3/08

[52] U.S. Cl. ...................................... 368/232; 29/177; 204/6

[58] Field of Search ............. 29/177; 58/88 G, 127 R; 204/6, 8, 49, 38 S; 368/223, 228, 230, 232–236; 76/107 R; 427/443.1

[56] References Cited

U.S. PATENT DOCUMENTS 1,834,763 12/1931 Bonsieur ................................ 204/6
2,282,022 5/1942 Bishop et al. ...................... 204/38 S
2,327,762 10/1939 Bull ........................................ 204/6
2,865,821 12/1958 Janke et al. ............................ 204/6
3,054,175 9/1962 Spreter ............................ 29/177 X
3,535,211 10/1970 Frowde .................................. 204/6
3,649,474 3/1972 Blakeslee et al. ....................... 204/6
3,989,603 11/1976 Montavon ............................ 29/177

FOREIGN PATENT DOCUMENTS 207883 3/1940 Switzerland ......................... 58/127
3707 of 1883 United Kingdom ................... 204/8

OTHER PUBLICATIONS

Metal Finishing Guidebook and Directory, 1976, Published by Metals and Plastics Publications, Inc., pp. 188–204, 264–285, 419–427, 461–468.

*Primary Examiner*—Vit W. Miska
*Attorney, Agent, or Firm*—Holman & Stern

[57] ABSTRACT

A dial plate or masking plate for a timepiece, having a pattern formed on a surface of the dial plate by embossing with a mold formed of a hard metal by an electroforming process.

14 Claims, 19 Drawing Figures

DECORATIVE PLATE FOR A TIMEPIECE

BACKGROUND OF THE INVENTION

This invention relates to a method of forming patterns upon a dial plate or masking plate of a timepiece, by embossing the dial plate or masking plate with a mold formed by an electroforming process.

The dial plate of a conventional type of timepiece having time indicating hands, or the masking plate of an electronic timepiece of digital display plate is generally made from a material such as brass. In order to render the timepiece more attractive, it is a common practice to form a pattern on the visible surface of the dial plate or masking plate. Conventionally, such a pattern is produced by means of surface treatment with a rotating metal brush, or by transferring a design to the plate by means of electroforming. The method of using a metal brush to from a pattern has the disadvantage that the variety of designs which can be produced is limited, and that rather elaborate facilities are required in order to implement this method on a mass production basis. Use of a plate having a pattern formed thereon by electroforming has the disadvantage that copper is almost the only metal which is suitable for use as the electroforming material, due to economic and other considerations. Since copper is a relatively soft metal, this method makes it difficult to securely weld the legs of the dial plate or masking plate to the body of the timepiece. In addition, due to the complexity of the electroforming process, and the low yield obtained, this process is unsuited to mass production manufacture, so that it is difficult to produce dial plates or masking plates at low cost by this method.

Another method which is sometimes adopted is to directly emboss a pattern from some pattern forming material, such as a layer of small steel balls for example, onto the dial plate surface. However this method is also difficult to implement on a mass production basis, and it is also difficult to secure a high degree of reproducibility of the pattern.

SUMMARY OF THE INVENTION

With the method of the present invention for forming a pattern upon a dial plate or masking plate, such disadvantages of the conventional methods are eliminated. A mold is formed from a hard metal, with the desired pattern being transferred to this mold by means of an electroforming process. The hard metal mold is then used to emboss the desired pattern on a blank, from which the dial plate or masking plate is formed. With the method, plates can be embossed with a high degree of accuracy and repeatability, and the molds can be used for a long period of time without deterioration of the pattern produced. Patterns of great delicacy and complexity can be freely produced, such as the surface contours of natural objects. Also, due to the suitability of the method to mass production, and the high yield which is obtained, dial plates or masking plates can be produced at lower cost than is possible with conventional methods.

It is therefore an object of the present invention to provide a method of manufacturing dial plates and masking plates for timepieces having a pattern formed on a surface thereof, whereby the disadvantages of previous methods of forming such patterns will be overcome.

Further objects, features and advantages of the present invention will be made more apparent by reference to the following description, when taken in conjunction with the attached drawings, whose scope is given by the appended claims.

DESCRIPTION OF THE PREFERRED EMBODIMENTS

Figure 1:
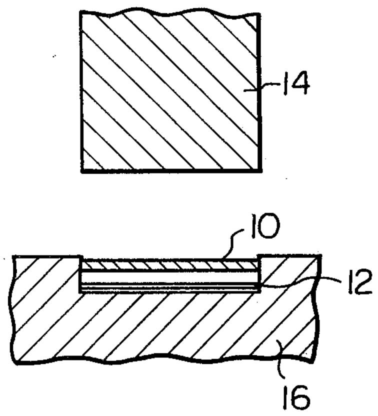
Fig. 1 PRIOR ART
FIG. 1 is a cross-sectional diagram illustrating a conventional method of forming a pattern on a surface of a dial plate or masking plate of a timepiece.

Referring now to the drawings, FIG. 1 illustrates a conventional method of forming a pattern on a timepiece dial plate or masking plate (both of which will be referred to hereinafter as a decorative plate, for simplicity of description). Numeral 10 indicates a pattern forming material, which may consist of paper, cloth, steel spheres, wire, glass fragments, etc. This is placed on the top surface of a blank plate 12, and then pressure is applied between the pattern forming material 10 and blank plate 12 by means of an upper die 14 and a lower die 16. As a result, the shape of the pattern forming material is embossed on the surface of blank plate 12.

This method has the disadvantage that it is difficult to transfer the pattern of a material such as paper or cloth to the dial plate 12, due to the softness of such a material, and the transferred pattern will display irregularities. In addition, the transferred design has poor workability, and a high degree of repeatability of design formation cannot be achieved.

Figure 2:
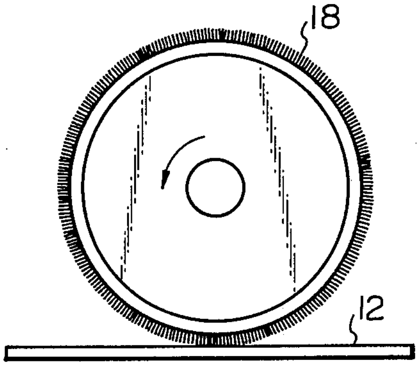
Fig. 2 PRIOR ART
FIG. 2 is a diagram illustrating another conventional method of forming a pattern on a dial plate or masking plate of a timepiece, by using a metal brush.

Another conventional method of forming a pattern on a dial plate is shown in FIG. 2. Here, a rotating brush, made of a material such as copper alloy, is used to form a design or pattern in the top surface of blank plate 12. This method has the disadvantage that the variety of designs which can be obtained is limited, and that a relatively large amount of equipment is required in order to produce dial plates on a large-scale basis.

Figure 3:
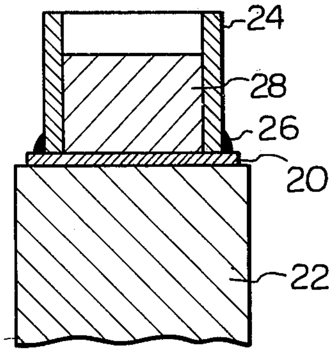
FIG. 3, FIG. 4, FIG. 5, FIG. 6, FIG. 7, and FIG. 8 illustrate stages in forming a pattern on a dial plate or masking plate of a timepiece by a first embodiment of the method of the present invention.
Figure 4:
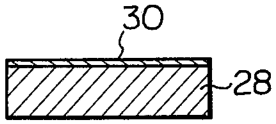

FIG. 3 illustrates a first step in producing an electroformed mold, for forming a pattern on a decorative plate in accordance with the present invention. Numeral 20 indicates a pattern forming base material, having a surface pattern which is to be transferred to a decorative plate. This pattern forming base material can consist of wood, paper, leather, etc., and is placed on a lower base 22. A glass ring 24 is then placed over the pattern forming base material 20, and the junction between the glass ring 24 and the pattern forming material 20 is filled with a sealant material such as clay, indicated by numeral 26. A curable resin 28 is then poured into the glass ring 24, covering the pattern forming material 20. When the resin 28 has hardened, the surface pattern of the pattern forming base material 20 will have been transferred to the lower surface of the resin. Resin 28 is then treated by a non-electrolytic type of coating process such as vapor deposition or chemical plating whereby an electrically conductive layer 30 is formed on the surface of the resin to which the desired pattern has been transferred. The resin block 28, thus coated, is then cut to a suitable shape, to provide an electroforming matrix as shown in FIG. 4.

Figure 5:
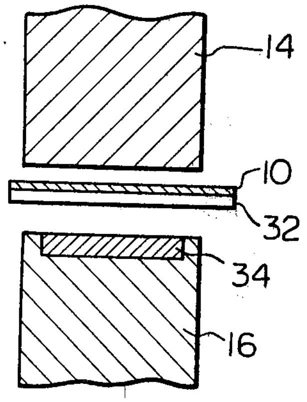
Figure 6:
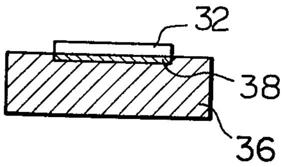

FIGS. 5 and 6 illustrate an alternative method of providing an electroforming matrix. As shown in FIG. 5, a pattern forming base material 10 is placed upon a layer of pattern receiving material 32 which is electrically conductive. The layers of material are then subjected to pressure between an upper die 14 and a lower die 16. For improved pattern transfer effectiveness, a layer of urethane rubber 34 is provided on the upper surface of lower die 16. The pattern of the pattern forming material 10 is thus transferred to the pattern receiving material. The pattern receiving material 32 is then cut to a predetermined shape and attached to an electroforming jig 36, by means of chemical bonding material 38 or by being mechanically attached. This completes the preparation of an electroforming matrix 40, as shown in FIG. 6.

Figure 7:
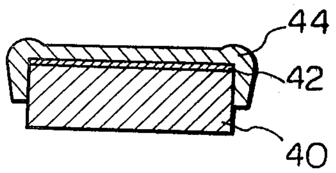

The electroforming matrix 40 which has been formed is then subjected to a surface passivation treatment, in order to prevent the electroformed mold, formed a described below, from adhering to the surface of the electroforming matrix. As shown in FIG. 7, a layer 44 of a hard metal such as nickel or chromium is then electroformed over the passivated layer 42. The layer of hard metal 44 can then be stripped from the passivated layer 42.

For increased hardness of electroformed layer 44, nickel can then be chemically deposited onto the electroformed nickel 44, or the chemical proportions of the electrolytic fluid in which the electroformed layer 44 is deposited can be varied to obtain increased hardness. It is also possible to apply heat treatment to electroformed layer 44 for increased hardness.

Figure 8:
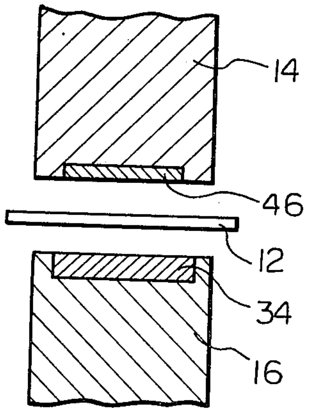

Layer 44 is then machined to a predetermined shape to form a mold 46 as shown in FIG. 8, which is retained within an upper die 14 by chemical bonding or mechanical means. A dial plate 12 is placed between mold 46 and a lower die 16 which has a layer of urethane rubber provided in its upper surface. Pressure is then exerted between die 46 and dial plate 12, causing the desired pattern to transferred from mold 46 to dial plate 12.

Due to the high mechanical strength and high degree of chemical stability of a mold produced as described above from nickel, chromium or other very hard metallic material, very large number of dial plates can be embossed with the desired design before any significant deterioration of mold 46 occurs. The method described above is therefore highly suitable for mass production of decorative plates for timepieces, with a high degree of reliability and design consistency.

Figure 9:
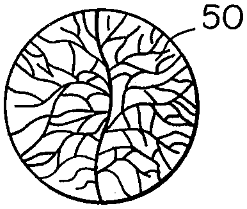
FIG. 9, FIG. 10, FIG. 11, FIG. 12, FIG. 13, and FIG. 14 illustrate stages in forming a pattern on a dial plate or masking plate of a timepiece by a second embodiment of the method of the present invention.
Figure 10:
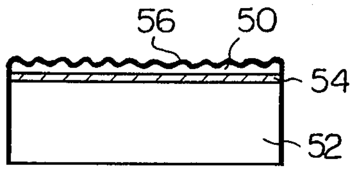

A second embodiment of the present invention will now be described. First, with this second embodiment, the surface contour pattern of a natural material which can be relatively soft, such as a plant leaf, leather, wood etc, can be transferred to a hard electroformed metal mold for embossing decorative plates for timepieces. FIG. 9 is a plan view of a part of a plant leaf, which will be used as an example of a natural material used as a pattern forming material. As shown in FIG. 10 plant leaf 50 is attached to an electroforming jig 52 by means of a bonding agent. A layer of metallic material 56 such as copper, nickel or silver is formed on the upper surface of plant leaf 50 by a non-electrolytic deposition process such as vapor deposition. This assemblage constitutes a primary electroforming matrix.

Figure 11:
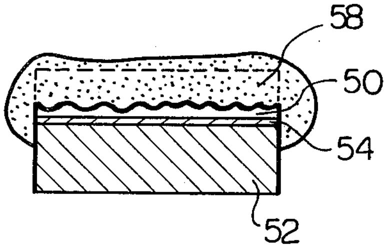

Referring now to FIG. 11, a layer of a hard metal 58, such as nickel, nickel cobalt or chromium, is electroformed on metallic layer 56. The hardness of this electroformed layer 58 can be increased by suitable adjustment of the composition of the electroforming electrolyte, by chemically adding nickel to the electroformed nickel as will be described in detail hereinafter, or by heat treatment. The electroformed layer 58 is then machined into a suitable shape to form a mold 60, which is attached to an upper die 14 as thickness of mold 60 should preferably be at least 1 milimeter. Then, the pattern of the natural object 50 has been transferred by the electroforming process to the mold 60. The mold 60 is embossed by applying pressure between the upper die 14 and a lower die 16. A layer of urethane rubber 34 is provided in lower die 16. A pressure of 250 $kg/cm^2$ is suitable for applying between upper die 14 and lower die 16 for the embossing process.

Figure 12:
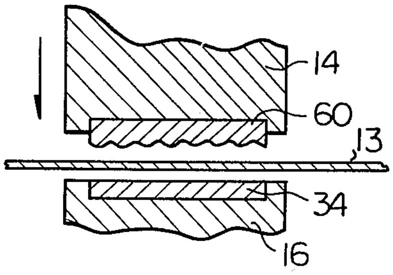

By using a blank strip of material 13 as shown in FIG. 12, a large number of decorative plates for timepieces can be consecutively produced in a rapid and efficient manner.

Figure 13:
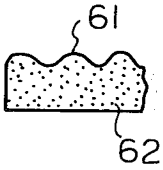

A modification of the second embodiment of the present invention described above will now be given. Referring to FIG. 11 again, a layer of metallic material 58 is electroformed on a metallic layer 50 of a primary electroforming matrix, as in the case of the second embodiment described above. However, with this modification of the second embodiment, layer 58 is electroformed from copper, rather than a hard metal such as nickel. A cross-sectional view of part of the electroformed copper layer thus formed is shown in FIG 13, with the copper layer being designated by the numeral 62. The contour pattern of the pattern forming material 50 transferred to electroformed layer 62 is indicated by numeral 61. If desired, the contour pattern 61 can be modified at this stage, by polishing, to a mirror surface, cutting graduations, forming lines by etching, etc.

Figure 14:
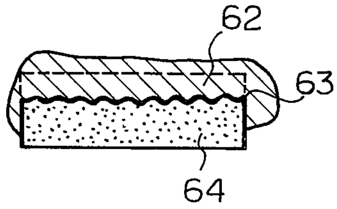

Copper layer 62 constitutes a secondary electroforming matrix. Referring now to FIG. 14, a passivation film 63 is formed over the surface of secondary electroforming matrix 62, and a layer of a hard metal such as nickel or cobalt 64 is electroformed on this passivation film 63. Passivation film 68 is formed by a process to be described in detail herein after, and enables layer 64 to be easily removed from the secondary electroforming matrix 62.

Hard metal layer 64 is now stripped from the secondary electroforming matrix 62, and is machined to a suitable shape to form a mold 60, as shown in FIG. 12, which is attached to an upper die 14, as in the case of the second embodiment of the present invention described above.

The modification of the second embodiment which has just been described has the advantage that, since the cooper which is used for the secondary electroforming matrix is a relatively soft metal, a secondary pattern can easily be added to the contour pattern which has been transferred from the pattern forming material 50.

Embossing of a strip of material 13 can now be performed in a repetitive manner, by utilizing the mold prepared as above by the modification of the second embodiment of the present invention.

It is also possible to replace the secondary electroforming matrix 62 shown in FIG. 13 and FIG. 14 by a piece of metal having a surface contour pattern formed of crystalling metal. This pattern can then be transferred to the mold 60 by applying a surface passivation layer to the crystalling metal pattern and performing electroforming as described above.

Figure 15:
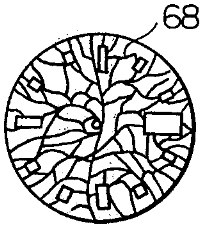
FIG. 15 illustrates the appearance of an example of a dial plate for a timepiece having a pattern formed an shown in FIG. 9 to FIG. 14.

After a decorative design has been embossed on material 13, a decorative plate 68 of suitable size in FIG. 15 is cut from material 13, and printing of numerals, cutting of openings for the timepiece hards rotor shaft and a window for a date display, etc, is performed. The decorative plate can also be plated with gold, silver, etc, if required, and the legs of the plate can then be welded to the timepiece movement.

Figure 16:
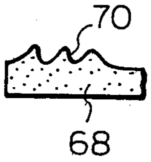
FIG. 16 illustrates a portion of the surface of the dial plate of FIG. 15.
Figure 17:
FIG. 17 illustrates a portion of a dial plate having a pattern formed by a modification of the method of the present invention, which is shown in FIG. 13 and FIG. 14.

FIG. 16 shows a cross-sectional view of the surface of a decorative plate prepared according to the first or second embodiments of the present invention, with numeral 70 indicating the contour pattern which has been transferred from the pattern forming material. FIG. 17 shows a cross-sectional view of a decorative plate prepared by the modification of the second embodiment described above. In this case, the contour pattern transferred from the pattern forming material has been modified by machining or chemical treatment of the secondary electroforming matrix 62, causing the pattern formed on the decorative plate 68 to be correspondingly modified.

Figure 18:
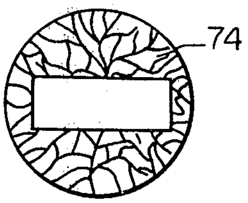
FIG. 18 illustrates an example of a masking plate for a digital electronic timepiece formed in accordance with the method of the present invention.
Figure 19:
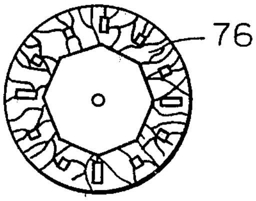
FIG. 19 illustrates an example of a dial ring for a timepiece having a pattern formed by the method of the present invention.

FIGS. 18 and 19 show a decorative plate prepared according to the method of the present invention, comprising a masking plate 74 for an electronic timepiece having a digital display.

FIG. 12 shows a decorative plate prepared according to the method of the present invention, comprising a masking ring for an analog type timepiece.

A preferred embodiment of the method of the present invention will now be described in detail. First, an electroforming matrix is prepared, by forming a contour pattern on an electrically conducting surface of an electroforming jig which is made of a material, and whose dimensions are $\Phi 50 \times 10^t$ millimeter (t: an integer). A passivation layer is then formed on the electrically conducting surface of the electroforming jig. The steps in forming this passivation layer are as follows:

(1) Washing with an organic solvent.
(2) Degreasing.
(3) Washing with water.
(4) Washing with an alkali (5% solution).
(5) Washing with water.
(6) Washing with an acid (sulfuric acid 5%)
(7) Washing with water.
(8) Flash nickel plating.
(9) Washing with water.
(10) Passivation treatment by utilizing a chromate.
(11) Washing with water.

Electroforming of a hard metal onto the electroforming matrix is then performed. The composition of the electroforming solution and the conditions of electroforming are as follows:

| 1. Composition of electrolyte for electroforming | |
|---|---|
| hard nickel | |
| Nickel sulfamate | 300 grams/liter-600 grams/liter |
| Nickel cholride | 5 grams/liter-500 grams/liter |
| Boric acid | 450 grams/liter |
| Saccharin | 0.5 grams/liter-10 grams/liter |
| Electroforming conditions | |
| Solution temperature | 20° centigrade-60° centigrade |
| Current density | 5 ampere/density square meter-30 ampere/density square meter |
| PH | 3.5-4.5 |
| Solid state properties of deposited nickel | |
| Hardness | 400-600 Vickers |
| 2. Composition of electrolyte for electroforming | |
| Hard chromium | |
| Chromic acid | 200 grams/liter-300 grams/liter |
| Potassium silicofluoride | 0.5 grams/liter-300 grams/liter |
| Strontium sulfate | 3 grams/liter-10 grams |
| Electroforming conditions | |
| Solution temperature | 50° centigrade-65° centigrade |
| Current density | 10 ampere density square meter-50 ampere/density square meter |
| Solid state properties of deposited chromium | |
| Hardness | 700-800 Vickers |

The thickness of the deposited nickel or chromium should be at least 1 millimeter. The mold is machined to the required shape from the deposited metal while it is still connected to the electroforming matrix.

With the method of the present invention, it is possible to emboss dial plates having a thickness of less than 300 micron. In this case, a material with a hardness of 200 Vickers or more must be used to form the decorative plate, to ensure sufficient strength. In order to provide a mold having a sufficient lifetime when embossing of such a hard material is performed, the mold should be fabricated in accordance with the following procedure and conditions:

1. Manufacture of the mold a. The mold is prepared as described above, by electroforming from hard nickel.

b. The mold is machined to the requisite shape.

c. A layer of nickel having a thickness of from 1 micron to 5 micron is chemically deposited on the surface of the mold to which a contour pattern has been transferred by the electroforming process.

d. The mold is subjected to heat treatment under the conditions described hereinafter.

| 2. Composition of chemical nickel plating solution | |
|---|---|
| Nickel sulfate | 30 grams/liter |
| Sodium glucolnic acid | 30 grams/liter-40 grams/liter |
| Dimethyl Borane | 3 grams/liter-7 grams/liter |
| Ammonium sulfate | 10 grams/liter |
| 3. Plating conditions | |
| Solution temperature | 65° centigrade-70° centigrade |
| PH | 4-6 |
| Thickness | 1 micron-5 micron (5 to 20 minutes) |
| 4. Heat treatment conditions | |
| Temperature and time | 400° centigrade for 20 minutes |
| Atmosphere | Inert gas |
| Hardness | 1000-1100 Vickers |

The mold which has been formed and hardened as specified above is secured mechanically or by chemical bonding into an upper die of an embossing press. A blank plate made of brass material is placed between the upper die and a lower die, the latter die having a layer of urethane rubber provided on its top surface. Pressure is then applied between the upper and lower dies to transfer the contour pattern on the mold onto the blank plate.

It has been found experimentally that the lifetime of such a mold is sufficient to enable ten thousand dial plates to be manufactured, when a pressure of 250 kilograms/square centimeter is applied in the embossing press. No deterioration of the transferred contour pattern was observed, thus demonstrating that such a mold is highly suitable for mass production of decorative plates for timepieces.

From the above description, it will be apparent that dial plates of various types of material, bearing an embossed contour pattern of great detail and delicacy can be produced on a large scale production basis by the method of the present invention. Materials which can be used include brass, anodized aluminum, aluminum alloy, zinc, zinc alloy, etc. It is also possible to produce decorative plates of extreme thinness, of the order of 200 micron, by the method of the present invention, using an extremely hard material such as stainless steel. The hardness of the material from which the decorative plate is formed does not present any limitation, so long as it is not more than about 50% of the hardness of the electroformed mold.

The method of the present invention also enables production of decorative plates for timepieces on a large scale industrial basis, since the embossing of the decorative plates can be performed on a continuous strip of stock material. The characteristic color or other surface properties can be utilized in order to enhance the appearance of the decorative plates.

Although the electroformed mold produced by the method of the present invention has been shown as used in press-type embossing in the described embodiments, it is also possible to use such a mold for roll embossing, to provide a greater variety of designs.

From the above description, it will be apparent that the method of the present invention enables decorative plates such as dial plates or masking plates for timepieces to be produced in an economical and efficient manner on a large scale production basis, and that decorative plates having a wide variety of designs and patterns can easily be manufactured.

Although the present invention has been shown and described with respect to particular embodiments, it should be noted that various changes and modifications to these embodiments are possible, which come within the scope claimed for the present invention.

What is claimed is:

1. A method of forming a decorative plate for a timepiece, comprising the steps of:

(a) preparing a pattern forming base material having a predetermined contoured surface pattern;

(b) transferring said predetermined contoured surface pattern to an electroforming matrix;

(c) flash plating a nickel alyer on said electroforming matrix;

(d) passivation treating said nickel layer to form a passivation layer;

(e) electroforming a mold on said passivation layer;

(f) stripping said mold from said passivation layer; and (g) embossing a blank sheet of material with said mold to form said decorative plate having a decorative pattern embossed thereon corresponding to said predetermined contoured surface pattern.

2. A method of forming a decorative plate for a timepiece according to claim 1, in which said decorative pattern of said decorative plate is formed on a whole surface of said decorative plate by said step (g).

3. A method of forming a decorative plate for a timepiece according to claim 1, in which said step (b) comprises:

placing said pattern forming base material on a pattern receiving material which is electrically conductive;

pressing said pattern forming base material and said pattern receiving material to transfer said predetermined contoured surface pattern to said pattern receiving material; and attaching said pattern receiving material to an electroforming jig to provide said electroforming matrix.

4. A method of forming a decorative plate for a timepiece according to claim 1, and further comprising the steps of: before said step (c), degreasing;

washing with water;

washing with a 5% solution of an alkali;

washing with water;

washing with a 5% solution of an acid; and washing with water.

5. A method of forming a decorative plate for a timepiece according to claim 4, and further comprising the step of:

before said step (d), washing with water.

6. A method of forming a decorative plate for a timepiece according to claim 5, and further comprising the step of:

before said step (e), washing with water.

7. A method of forming a decorative plate for a timepiece according to claim 1, in which said step (b) comprises:

covering said pattern forming base material with a resin material to transfer said predetermined contoured surface pattern to a surface of said resin material;

chemical plating an electrically conductive layer on the surface of said resin material to provide said electroforming matrix.

8. A method of forming a decorative plate for a timepiece according to claim 1, in which said step (b) comprises:

placing said pattern forming base material on an electroforming jig;

non-electrolytic depositing an electrically conductive layer on said pattern forming base material to provide said electroforming matrix.

9. A method of forming a decorative plate for a timepiece according to claim 8, in which said pattern forming base material is selected from a group consisting of wood, paper, leather, cloth and crystalline material.

10. A method of forming a decorative plate for a timepiece according to claim 1, in which said step (b) comprises:

placing said pattern forming base material on an electroforming jig;

non-electrolytic depositing an electrically conductive layer on said forming base material; and electroforming an electroforming matrix on said electrically conductive layer.

11. A method of forming a decorative plate for a timepiece according to claim 10, in which said electroforming matris consists of copper.

12. A method of forming a decorative plate for a timepiece according to claim 1, further comprising the steps of:

before said step (e), electroforming a secondary electroforming matrix on said passivation layer;

stripping said secondary electroforming matrix from said passivation layer;

nickel plating on said secondary electroforming matris; and passivation treating said nickel to form a passivation layer.

13. A method of forming a decorative plate for a timepiece according to claims 3, 7, 8, 10 or 12, and further comprising the step of hardening said mold before said step (g).

14. A method of forming a decorative plate for a timepiece according to any one of claims 1 to 12 alternatively, in which said nickel layer is treated with a chromate in said step (d).

* * * * *